Aug. 16, 1955  M. E. DROZ ET AL  2,715,497
ELECTRIC INTEGRATING COMPUTER FOR RADAR TRAINER
Filed Dec. 13, 1945  2 Sheets-Sheet 1

INVENTORS
MARCEL E. DROZ
RAYMOND L. GARMAN

BY *M. O. Hayes*

ATTORNEY

United States Patent Office 2,715,497
Patented Aug. 16, 1955

2,715,497

ELECTRIC INTEGRATING COMPUTER FOR RADAR TRAINER

Marcel E. Droz and Raymond L. Garman, Cambridge, Mass., assignors, by mesne assignments, to the United States of America as represented by the Secretary of the Navy Application December 13, 1945, Serial No. 634,845

7 Claims. (Cl. 235—61.5)

This invention relates to computing devices, and more particularly, to electromechanical apparatus for supplying continuous solutions of a plurality of parametric equations.

In some problems, it is necessary to provide continuous solutions of a set of interrelated equations. For example, if the velocity components of an object in space are known, the instantaneous position of the object can be specified in three dimensional coordinates by the simultaneous solutions of three integral equations involving the velocity parameters. If a continuous set of solutions of such equations is needed, a computer system may be designed which can supply such solutions in the form of mechanical displacements or voltages proportional to the instaneous coordinates of the object.

One application of such computers could be for the purpose of supplying continuous information as to the position of a simulated aircraft to an apparatus for training radar operators. A course and speed may then be assigned to the simulated aircraft, and the position information supplied to the radar trainer by the computer will be the same as that obtained by a radar system from an aircraft following the designated course and speed.

It is accordingly a primary object of this invention to provide an electromechanical computer which will furnish continuous solutions of a plurality of parametric equations.

It is also an object of this invention to provide an electromechanical computer which will continuously furnish the instantaneous values of the three dimensional coordinates of an object in space having variable velocity parameters.

It is further an object of this invention to provide an electromechanical computer which will furnish continuous solutions of the integral equations of motion in polar coordinates of an aircraft whose course and velocity may be varied at any time.

A better understanding of the mathematical problem involved and of the invention may be had by reference to the following detailed description and the appended drawings, in which.

Figure 1:
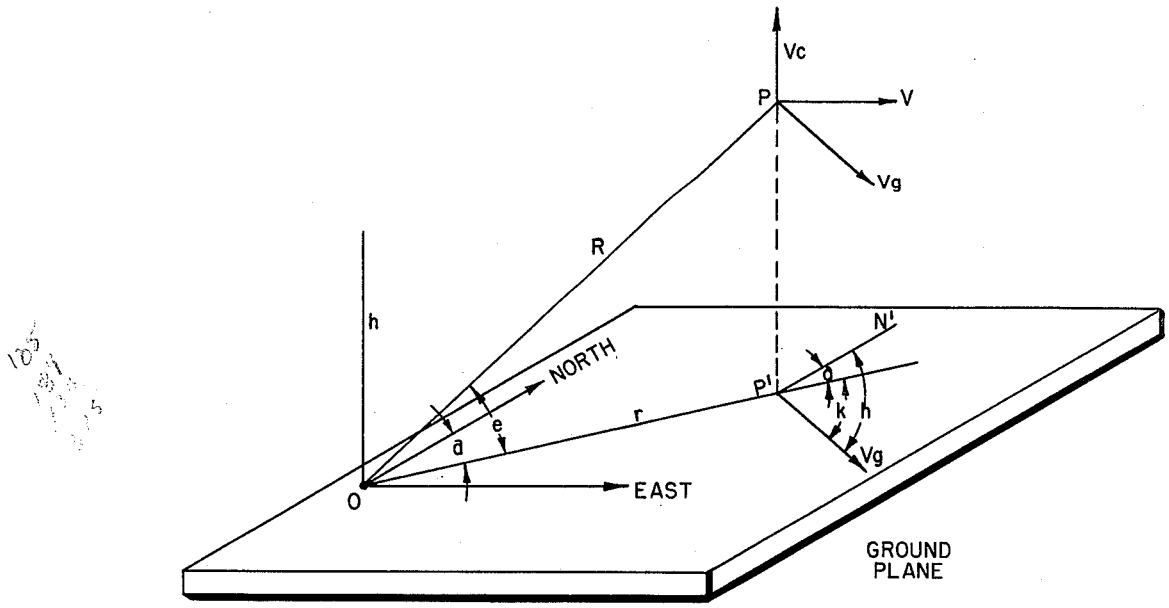
Fig. 1 is a vector diagram representing the spatial relations of an airplane in a set of polar coordinates.

The symbols used in the drawings and in the accompanying discussion have the following meanings:

O—Origin of the coordinate system.
P—Instantaneous position of the plane.
P'—Projected position of P on the ground plane.
R—Slant range of plane from O.
$r$—Ground range of plane from O or the horizontal projection of the slant range.
$e$—The elevation angle of the plane. This is the angle between the slant range and the ground range.
$h$—Heading angle of the aircraft with respect to north.
$a$—Azimuth angle of the airplane. (Both angles $h$ and $a$ are measured from the north direction, a positive angle being generated by a clockwise rotation when looking down from above.)
$k$—$(h-a)$, the difference between the azimuth angle and the plane's heading.
V—Velocity of the plane.
$V_c$—Vertical component of the velocity. The positive direction is taken as upward.
$V_g$—Horizontal component of the velocity, or the ground speed.

In Fig. 1, the point O is taken as the origin of the system of coordinates. The aircraft is at the point P and is moving with a velocity V. The equations which describe the motion of the aircraft will be in terms of the azimuth angle $a$, range R and elevation angle $e$. In the determination of the azimuth equation, the ground range, $r$, is assumed to be equal to the slant range R. This approximation will result in only negligible error in radar trainer operation, since the elevation in angles in such trainer problems will normally lie between 3° and 6°. At the maximum elevation angle of 6°, the slant range R differs from the ground range $r$, by only 0.58%. This simplification is made in this embodiment only and is not essential to the invention.

Figures 2, 3:
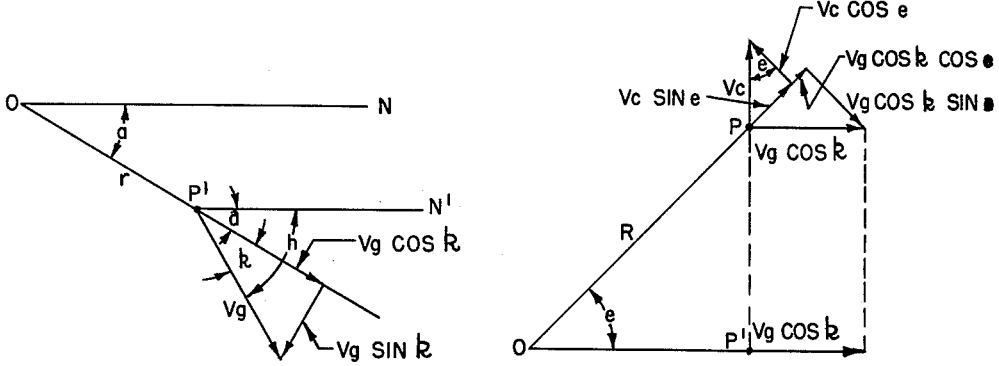
Fig. 2 is a horizontal projection of Fig. 1.
Fig. 3 is a vertical projection of Fig. 1.

In Fig. 2, $V_g$ is the horizontal component of the velocity of the plane, or the ground speed. It is convenient to resolve $V_g$ further into components parallel to and perpendicular to $r$. These components are $V_g \cos k$ and $V_g \sin k$ respectively, where $k$ is the angle between the direction of $r$ and the heading of the plane. The only effect of the $V_g \sin k$ component is to cause rotation of the line OP' ($r$) about the point O, that is to change the azimuth angle $a$. The other components of the velocity, $V_g \cos k$ and $V_c$ (see Fig. 3), will have no effect on the angle $a$. Therefore, using the familiar mathematical relationship between angular velocity, radius, and tangential velocity for circular motion, the equation for the rate of change of azimuth angle becomes $$\frac{da}{dt} = \frac{V_g \sin k}{r}$$

Now if $a_0$ represents the azimuth angle of the plane with respect to O at an initial time $t_0$, taken to be the starting time of the problem, the integral form of the equation for the azimuth position of the plane at any subsequent time, $t_n$, will be $$a_n = a_0 + \int_{t_0}^{t_n} \frac{V_g \sin k \, dt}{r}$$

In Fig. 3, the component $V_g \cos k$ which lies along the ground range line $r$, has been further resolved into components along and perpendicular to R, these components being $V_g \cos k \cos e$ and $V_g \cos k \sin e$ respectively. The vertical component of the velocity $V_c$ has also been similarly resolved, resulting in the vectors $V_c \sin e$ and $V_c \cos e$. The sole effect of the resulting vectors perpendicular to R is to rotate the line OP about the point O, that is to change the elevation angle $e$. These two components have opposite directions, so the tangential velocity of the point P will be the difference between these vectors. Since the upward direction has been taken as positive, this tangential velocity becomes $$V_c \cos e - V_g \cos k \sin e$$

As in the above discussion with respect to $a$, the rate of change of the elevation angle $e$ is $$\frac{de}{dt} = \frac{V_c \cos e - V_g \cos k \sin e}{R}$$

and taking $e_0$ as the initial elevation of the plane, the integral form of the equation for the elevation angle at any time $t_n$ becomes $$e_n = e_0 + \int_{t_0}^{t_n} \frac{(V_c \cos e - V_g \cos k \sin e) dt}{R}$$

The remaining two components $V_c \sin e$ and $V_g \cos k \cos e$ will act to move the point P along R or change the range of the plane. The rate of change of R is then the algebraic sum of these two components, and is equal to $$\frac{dR}{dt} = V_c \sin e + V_g \cos k \cos e$$

If $R_0$ is taken as the initial range of the plane the integral form of the range equation will be $$R_n = R_0 + \int_{t_0}^{t_n} (V_c \sin e + V_g \cos k \cos e) dt$$

The three equations $$a_n = a_0 + \int_{t_0}^{t_n} \frac{V_g \sin k \, dt}{r}$$

$$R_n = R_0 + \int_{t_0}^{t_n} (V_c \sin e + V_g \cos k \cos e) dt$$

$$e_n = e_0 + \int_{t_0}^{t_n} \frac{(V_c \cos e - V_g \cos k \sin e) dt}{R}$$

then will specify the position of the plane in the above system of coordinates at any time. It is thus apparent that a continuous set of solutions of these equations must be furnished by the invention if it is to be used in connection with a radar trainer.

Figure 4:
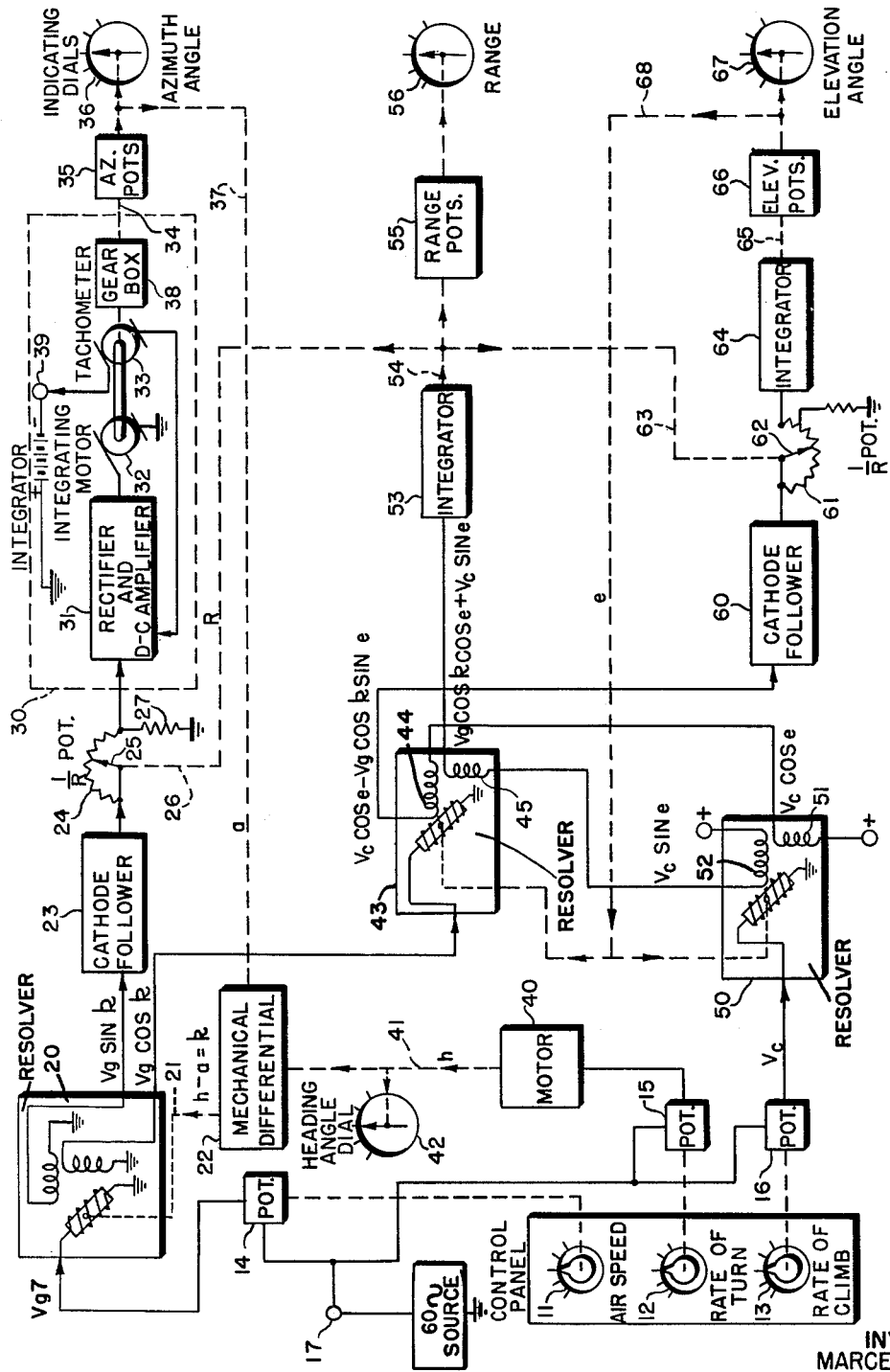
Fig. 4 is a block diagram of one embodiment of the invention.

Fig. 4 is a simplified block diagram of an embodiment of the invention, the solid lines denoting electrical connections between the blocks and the dotted lines representing mechanical connections. Fig. 4 has been simplified by the omission of certain items, such as slip clutches, and micro-switches which are not necessary to the understanding of the invention. A set of control knobs 11, 12 and 13 control the respective settings of potentiometers 14, 15, and 16, which are connected to a 60 cycle potential source at terminal 17. The outputs of potentiometers 14, 15 and 16 are thus under the continuous control of the operator and may be varied at any time. The output of potentiometer 14 is kept adjusted by knob 11 to a value representing the desired airspeed, which on the assumption that $r = R$ becomes $V_g$, of the simulated aircraft. This voltage proportional to the desired $V_g$ is fed to the rotor winding of a two-stator resolver 20. A resolver has two stator windings which are positioned so that their respective axes are geometrically at right angles to one another. These stator windings will act like the secondaries of a transformer, the primary being the rotor winding, with the additional feature that the amplitudes of the voltages generated in the two stator windings will be proportional to the sine and cosine respectively of the angle between the rotor and a predetermined one of the stator windings. The rotor is positioned by a mechanical shaft 21 from the mechanical differential 22 at an angle $k$ with respect to one of the stator windings, the angle $k$ being equal to the difference between the heading angle $h$ and the azimuth angle $a$ of the simulated plane. The mechanical inputs equal to angle $h$ and to angle $a$ fed into differential 22 will be described later. The two stator windings of resolver 20 will then supply output voltages proportional to $V_g \sin k$ and $V_g \cos k$ respectively, representing the ground speed components discussed with reference to Fig. 2. The first of these outputs, $V_g \sin k$, of resolver 20 is coupled through cathode follower 23 to potentiometer 24. The moving contact 25 of potentiometer 24 is actuated by drive shaft 26 from the output of the range channel of the invention in a manner such that the angular position of contact 25 is proportional to the range R of the simulated aircraft. Movable contact 25 is electrically connected to the input end of potentiometer 24 and the output is taken off between the variable resistance thus formed and a fixed resistor 27. The resistances of potentiometer 24 and resistor 27 are so related that the output of potentiometer 24 will then be proportional to $$\frac{V_g \sin k}{R}$$

and this output is fed to an integrator 30. Integrator 30 comprises a rectifier and D. C. amplifier 31, a D. C. motor 32, and a small generator or tachometer 33 coupled to the shaft of motor 32. Rectifier and amplifier circuit 31 is so designed that its voltage output is directly proportional to the voltage input over the range of voltages necessary for controlling motor 32. Motor 32 is a D. C. motor whose speed is controlled so as to be linearly proportional to the input voltage, and hence, the number of turns of its rotor shaft will be proportional to the integral of voltage input over a given period of time. Tachometer 33 coupled to the shaft of motor 32 acts as a D. C. generator, the output of which is proportional to the speed of motor 32. The output of tachometer 33 and a suitable bias voltage obtained from a potential source applied at terminal 39 are applied in inverse feedback as an anti-hunt circuit to control the gain of amplifier 31 and improve the linearity of the integrator. As the speed of motor 32 increases, the output of generator 33 increases in direct proportion to motor speed. This increased output of generator 33 increases the bias on the first amplifier tube, reducing the gain of amplifier 31 and tending to slow down motor 32 until a position of equilibrium is reached. Since the output of generator 33 is directly proportional to the speed of motor 32, this equilibrium speed will be directly proportional to the magnitude of the input voltage signal for all values of the input signal.

Shaft 34 is driven by motor 32 through gear reduction box 38 which reduces the motion of motor 32 to an angular displacement of shaft 34 which is equal to the azimuth angle $a$. Since the input to integrator unit 30 is a voltage proportional to $$\frac{V_g \sin k}{R}$$

the angular position of shaft 34 at any time $t_n$ will be proportional to the integral $$\int_{t_0}^{t_n} \frac{V_g \sin k \, dt}{R}$$

by means of a slip clutch, shaft 34 could be given an original angular displacement $a_0$, equal to the original azimuth angle of the plane. The position of shaft 34 will then be a solution of the integral equation $$a_n = a_0 + \int_{t_0}^{t_n} \frac{V_g \sin k \, dt}{R}$$

which is the azimuth angle equation developed in the previous discussion. Shaft 34 positions the moving contacts of the azimuth potentiometers of the radar trainer, represented in Fig. 4 by block 35, and also controls azimuth angle dial 36. Shaft 34 is also coupled by means of shaft 37 to mechanical differential 22 supplying the azimuth angle, or $a$, input.

Control knob 12 adjusts the setting of potentiometer 15 so that its output is proportional to the instantaneous rate of turn, or change of heading angle $h$ of the simulated aircraft. This voltage is fed to a motor 40 driving shaft 41 through suitable gear reduction at a rate proportional to the desired rate of turn, and the instantaneous angular position of shaft 41 will represent the heading angle $h$ of the simulated aircraft. There is a zero position on potentiometer 15, at which setting the rotor of motor 40 will be stationary. The heading angle $h$ is fed by shaft 41 to a heading dial 42 and to the second input of mechanical differential 22. Differential 22 is therefore supplied with two inputs, equal to the azimuth angle $a$ and the heading angle $h$ respectively and the output of differential 22 will be difference between these two inputs, or equal to the angle $k$, and is used to position the rotor winding of resolver 20 as previously described.

The second output, $V_g \cos k$, of resolver 20 is fed to the rotor winding of a similar two stator resolver 43, the rotor being positioned with respect to stator winding 45 at an angle $e$, the elevation angle of the simulated air craft, by a means to be described later. There will then be generated in the stator windings 44 and 45 of resolver 43 voltages proportional to $V_g \cos k \sin e$ and $V_g \cos k \cos e$ respectively. The output of potentiometer 16 is kept adjusted to a value proportional to the desired rate of climb, or $V_c$ by knob 13. This voltage proportional to $V_c$ is fed to the rotor winding of resolver 50, which is similar in all respects to resolvers 20 and 43. The rotor of resolver 50 is adjusted to an angle $e$ with respect to stator winding 51 by a mechanical coupling to the rotor of resolver 43. The voltages established in stator windings 51 and 52 of resolver 50 will be proportional to $V_c \cos e$ and $V_c \sin e$ respectively. Stator winding 52 of resolver 50 and stator winding 45 of synchro 43 are connected in series aiding, resulting in a combined output to integrator 53 equal to $V_g \cos k \cos e + V_c \sin e$.

Integrator 53 is of the same type as integrator 30 and the angular rotation of output shaft 54 will be a function of the integral of the voltage input. The instantaneous position of shaft 54 will be a function of the integral $$\int_{t_0}^{t_n} (V_g \cos k \cos e + V_c \sin e) dt$$

and if at the beginning of the problem shaft 54 were given an initial angular displacement proportional to the initial range $R_0$, the output of shaft 54 will be a continuous solution of the range equation $$R_n = R_0 + \int_{t_0}^{t_n} (V_g \cos k \cos e + V_c \sin e) dt$$

as previously derived.

Shaft 54 drives the range potentiometers of the trainer as represented by block 55, and the range indicating dial 56. There is also a coupling between shaft 54 and 26 to move the contact 25 of potentiometer 24 in a manner proportional to the range $R$ as noted in the previous discussion of the azimuth channel.

Stator winding 51 of resolver 50 and stator winding 44 of resolver 43 are connected in series opposing, the resultant output being the difference between the respective voltages generated in the two windings and therefore proportional to $V_c \cos e - V_g \cos k \cos e$. This output is coupled through cathode follower 60 to a potentiometer 61 which is similar in all respects to potentiometer 24. The movable contact 62 of potentiometer 61 is actuated by shaft 63 which is coupled to output shaft 54 of the range channel. Shaft 63 adjusts contact 62 to an angular position proportional to the range $R$ of the simulated aircraft. The output of potentiometer 61 is then proportional to $$\frac{V_c \cos e - V_g \cos k \sin e}{R}$$

and is fed to an integrator 64 which is similar to integrators 53 and 30. The angular position of output shaft 65 of integrator 64 will be a function of the integral.

$$\int_{t_0}^{t_n} \frac{(V_c \cos e - V_g \cos k \sin e) dt}{R}$$

If shaft 65 were given an initial angular displacement proportional to the elevation angle $e_0$ of the simulated aircraft at the beginning of the problem, the angular position of shaft 65 at any time will be a solution of the elevation equation $$e_n = e_0 + \int_{t_0}^{t_n} \frac{(V_c \cos e - V_g \cos k \sin e) dt}{R}$$

as previously derived. Shaft 65 is used to drive the elevation potentiometers of the trainer, represented by block 66, and the elevation angle dial 67. Shaft 65 is also coupled to shaft 68, which drives the rotors of resolvers 43 and 50, this connection keeping the angle between the axis of each of the rotor windings and the axis of one of the stator windings of the respective resolvers equal to $e$ as above-described.

In the manner described, the instantaneous settings of potentiometers 35, 55 and 66 and indicating dials 36, 56 and 67 will be solutions of the equations of motion of an aircraft following a course as determined by the settings of control knobs 11, 12 and 13, thus supplying the positional information required by the radar trainer.

In other embodiments of this invention the inputs may be voltages as in the above description, or mechanical shaft rotations, or a combination of both. These inputs may be remotely controlled by direct mechanical linkage or by servomechanism drive. One modification of the above described embodiment could receive the course, speed, and rate of climb information from a pilot training device such as a Link trainer, and have additional inputs for wind direction and velocity providing continuous solutions of the complete problem of an aircraft in flight as an improved indication to the "pilot" of the Link trainer.

The above description of one embodiment of the invention and an application thereof illustrates the principles of the invention. Other embodiments and applications will occur to those skilled in the art, and no attempt has been made to exhaust such possibilities. The scope of the invention is defined in the following claims.

What is claimed is:

1. An electrical computer for the continuous solution in a polar coordinate reference system of the instantaneous position of a moving object in space from its horizontal and vertical velocity components, comprising a source of alternating current, means for deriving potentials from said source proportional to said velocity components, means for resolving said potentials into voltage components in said polar coordinate system, means for deriving from said resolved voltage components resultant voltages representing angular and radial velocity components in said polar coordinate system, means for integrating said resultant voltages to obtain outputs proportional to change of positional polar coordinates of said object, and means to adjust the outputs of said resolving means continuously in response to the instantaneous value of said positional polar coordinates to correct said resultant potentials for the changing position of said moving objects.

2. An electrical computer for the continuous solution in a polar coordinate reference system of the instantaneous position of a moving object in space from its horizontal and vertical velocity components and its initial position in said coordinate system comprising, a source of alternating current, means for deriving potentials from said source proportional to said velocity components, means for resolving said potentials into voltage components in accordance with said initial position of said object in said polar coordinate system, means for deriving from said resolved voltage components resultant voltages representing angular and radial velocity components in said polar coordinate system, means for integrating said resultant voltages to obtain outputs proportional to change of positional polar coordinates of said object, and means to adjust the outputs of said resolving means continuously in response to the instantaneous value of said positional polar coordinates to correct said resultant potentials for the changing position of said moving object from said initial position.

3. In the operation of radar trainers of the type in which the space relationships of radar apparatus and target are represented by voltages, apparatus for automatically continuously converting the instantaneous motion vectors of a target, represented by voltages proportional to predetermined values of rate of turn, rate of climb, and ground speed, respectively, into polar coordinates of the instantaneous position in space expressed as azimuth, elevation and range, given the initial positional coordinates of said target, comprising, a source of alternating current, a plurality of potentiometers energized from said source, means for adjusting said potentiometers to establish potentials proportional to said vectors, a plurality of resolvers, each having a stator with two windings in quadrature and a single rotor winding adapted upon rotary displacement to induce potentials in said secondary windings proportional to the amplitude of potential energizing said rotor winding and to the sine and cosine, respectively, of the displacement angle, means for displacing said rotor windings angularly in accordance with the initial position of said target, motor means energized by the potential proportional to rate of turn to displace angularly the rotor winding of the first of said resolvers in representation of the angular change caused by said rate of turn, means for energizing the rotor winding of said first resolver by the potential proportional to ground speed to induce in the secondary windings thereof component potentials representing ground velocity components in said polar coordinate system, means to energize the rotor winding of the second of said resolvers by the component potential representing the component of ground speed effective to change range, means to energize the rotor winding of the third of said resolvers by the potential proportional to rate of climb, circuits for interconnecting said second and third resolver stator windings to produce resultant potentials representing velocity vector components effective to change range and elevation, respectively, a first integrator responsive to said resultant potential representing range change to produce an output shaft rotation proportional to the integral of said first integrator input, the angular position of said first integrator output shaft representing the instantaneous range of said target, a first variable resistance device energized by said first resolver component potential representing the ground velocity component effective to change azimuth and mechanically coupled to said first integrator output shaft to attenuate said component potential as a function of range, a second integrator responsive to said range attenuated first resolver component potential to produce an output shaft rotation proportional to the integral of said second integrator input, the angular position of said second integrator output shaft representing the instantaneous azimuth angle of said target, means for mechanically coupling said second integrator output shaft to displace angularly the rotor winding of said first resolver to correct the stator winding potentials of said first resolver for changing azimuth angle, a second variable resistance device energized by the resultant potential representing change of elevation and mechanically coupled to said first integrator to attenuate said change of elevation resultant potential as a function of range, a third integrator responsive to the range attenuated resultant potential representing elevation change to produce an output shaft rotation proportional to the integral of said third integrator input, the angular position of said third integrator shaft representing the instantaneous elevation angle of said target, and means for mechanically coupling said third integrator output shaft to displace angularly the rotor windings of said second and third resolvers to correct the stator winding potentials of said second and third resolvers for changing elevation angle.

4. An electrical computer for the continuous solution in polar coordinates of the instantaneous position of a moving object in space from its initial positional coordinates of range, elevation and azimuth and its compass heading and horizontal and vertical velocity components, comprising means for producing alternating voltages proportional in amplitude to said velocity components, means for resolving said voltages into voltage components in accordance with said initial position and heading of said object, means for deriving from said resolved voltage components resultant voltages representing tangential and radial velocity components, means to attenuate said voltages representing tangential velocity components in proportion to the range of said initial position to derive voltages representing angular velocities in radians per second, means to integrate said angular and radial velocity components to obtain outputs proportional to change of position in polar coordinates of said moving object, and means to adjust the outputs of said resolving means continuously in response to the outputs of said integrating means to correct the outputs of said resolving means for the changing position of said moving object.

5. An electrical computer for the continuous solution in polar coordinates of the instantaneous position of a moving object in space from its initial positional coordinates of range, elevation and azimuth and its compass heading and horizontal and vertical velocity components, comprising means for producing alternating voltages proportional in amplitude to said velocity components, means for resolving said voltages into voltage components in accordance with the initial azimuth and elevation of said initial position and heading of said object, means for deriving from said resolved voltage components resultant voltages representing tangential velocity components affecting elevation and azimuth, respectively, and a radial velocity component affecting range, means to attenuate said voltage components representing tangential velocity components affecting azimuth and elevation in proportion to the range of said initial position to derive voltages representing azimuth and elevation angular velocities in radians per second, means to integrate separately said angular and radial velocity components to obtain outputs proportional to change of position in range, azimuth and elevation of said moving object, and means to adjust the outputs of said resolving means continuously in response to the outputs of said integrating means to correct the outputs of said resolving means for the changing position of said moving object.

6. An electrical computer for the continuous solution in polar coordinates of the instantaneous position of a moving object in space from its initial positional coordinates of range, elevation and azimuth and its compass heading and horizontal and vertical velocity components comprising, a source of alternating current, a first resolver having a single winding rotor and a stator with two windings positioned in quadrature, means to energize said rotor winding from said source by a potential proportional to said horizontal velocity component, means for rotatably displacing said rotor in accordance with the initial azimuth position and compass heading of said object to resolve the potentials induced in said stator windings into voltages representing velocity components acting parallel and perpendicular, respectively, to the initial ground range line to the instantaneous projected position of said object on the ground plane, means to attenuate the output voltage representing the ground velocity component acting perpendicularly to said ground range line in proportion to the initial range coordinate of position to derive a voltage proportional to the azimuth angular velocity in radians per second, an integrator responsive to said attenuated voltage to obtain an output shaft rotation proportioned to the instantaneous azimuth coordinate of the position of said object, and means for mechanically coupling said integrator output shaft to displace angularly the rotor of said resolver to correct the stator winding potentials for the changing azimuth angle.

7. An electrical computer for the continuous solution in polar coordinates of the instantaneous position of a moving object in space from its initial positional coordinates of range, elevation and azimuth and its compass heading and horizontal and vertical velocity components comprising, a source of alternating current, means for deriving potentials from said source proportional to said velocity components, a first resolver having a single winding rotor and a stator with two windings positioned in quadrature, means to energize said rotor winding from said source by a potential proportional to said horizontal velocity component, means for rotatably displacing said rotor in accordance with the initial azimuth position and compass heading of said object to resolve the potentials induced in said stator windings into voltages representing velocity components acting parallel and perpendicular, respectively, to the initial ground range line to the instantaneous projected position of said object on the ground plane, means to attenuate the output voltage representing the ground velocity component acting perpendicularly to said ground range line in proportion to the initial range coordinate of position to derive a voltage proportional to the azimuth angular velocity in radians per second, an integrator responsive to said attenuated voltage to obtain an output shaft rotation proportioned to the instantaneous azimuth coordinate of the position of said object, means for mechanically coupling said integrator output shaft to displace angularly the rotor of said resolver to correct the stator winding potentials for the changing azimuth angle, a second integrator responsive to said voltage representing the ground velocity component acting parallel to said ground range line to obtain an output shaft rotation proportional to the instantaneous range coordinate of said object, and means for mechanically coupling said second integrator output shaft to adjust said attenuating means to correct the voltage attenuated thereby for changing range.

References Cited in the file of this patent

UNITED STATES PATENTS

| 2,382,994 | Holden | Aug. 21, 1945 |
| 2,408,081 | Lovell et al. | Sept. 24, 1946 |